(12) United States Patent
Zucconelli et al.

(10) Patent No.: US 11,127,226 B2
(45) Date of Patent: Sep. 21, 2021

(54) ON-BOARD DEVICE ADAPTED TO ACQUIRE DATA RELATING TO MOTION AND/OR DRIVING PARAMETERS OF A VEHICLE

(71) Applicant: OCTO TELEMATICS SPA, Rome (IT)

(72) Inventors: Paolo Zucconelli, Rome (IT); Giuseppe Zuco, Rome (IT)

(73) Assignee: OCTO TELEMATICS S.P.A., Rome (IT)

( * ) Notice: Subject to any disclaimer, the term of this patent is extended or adjusted under 35 U.S.C. 154(b) by 139 days.

(21) Appl. No.: 16/311,977

(22) PCT Filed: Jun. 27, 2017

(86) PCT No.: PCT/IB2017/053829
§ 371 (c)(1),
(2) Date: Dec. 20, 2018

(87) PCT Pub. No.: WO2018/002820
PCT Pub. Date: Jan. 4, 2018

(65) Prior Publication Data
US 2019/0206151 A1    Jul. 4, 2019

(30) Foreign Application Priority Data
Jun. 30, 2016  (IT) .................. 102016000067783

(51) Int. Cl.
*G07C 5/00*   (2006.01)
*H04W 4/80*   (2018.01)
(Continued)

(52) U.S. Cl.
CPC .............. *G07C 5/008* (2013.01); *G07C 5/08* (2013.01); *G07C 5/085* (2013.01); *H04W 4/40* (2018.02); *H04W 4/80* (2018.02)

(58) Field of Classification Search
CPC combination set(s) only.
See application file for complete search history.

(56) References Cited

U.S. PATENT DOCUMENTS

2015/0032291 A1* 1/2015 Lowrey ............... G07C 5/0808
                                                    701/2
2015/0312655 A1* 10/2015 Balakrishnan ......... G07C 5/008
                                                    340/870.07

FOREIGN PATENT DOCUMENTS

EP     2495703 A1   5/2012
WO  2011053357 A1   5/2011

* cited by examiner

*Primary Examiner* — Thomas G Black
*Assistant Examiner* — Ana D Thomas
(74) *Attorney, Agent, or Firm* — Arent Fox LLP; Michael Fainberg

(57) ABSTRACT

An onboard device to acquire data relating to motion and/or driving parameters of a vehicle is described, the device, comprising: at least one data source internal to the on-board device adapted to provide in output a first data signal containing data correlated to motion and/or driving parameters of the vehicle; a data processing unit to receive and process said first data signal; a long-range radio communication interface to allow a data transmission on a telecommunications network between the data processing unit and a remote processing centre; a first short-range Bluetooth radio communication interface to allow the on-board device to receive at least one data signal from an external device, the external device comprising a data source external to the on-board device and a second short-range Bluetooth radio communication interface.

6 Claims, 1 Drawing Sheet

(51) Int. Cl.
*G07C 5/08* (2006.01)
*H04W 4/40* (2018.01)

ON-BOARD DEVICE ADAPTED TO ACQUIRE DATA RELATING TO MOTION AND/OR DRIVING PARAMETERS OF A VEHICLE

CROSS-REFERENCE TO RELATED APPLICATIONS

This application is the U.S. National Stage Application of International Patent Application No. PCT/IB2017/053829, filed on Jun. 27, 2017, which claims priority to Italian Patent Application No. 102016000067783, filed on Jun. 30, 2016, the contents of each of which is incorporated herein by reference in its entirety.

TECHNICAL FIELD OF THE INVENTION

The present invention relates to an on-board device adapted to acquire data relating to motion and/or driving parameters of a vehicle.

STATE OF THE ART

On-board devices for real-time acquisition and remote transmission, for example to a remote processing centre, of data relating to motion and/or driving parameters of vehicles are known of and widely used. Such on-board devices advantageously allow the detection of accidents, the reconstruction dynamics thereof, the monitoring of driving styles and habits and the tracking of vehicles.

The aforesaid on-board devices are usually called telematics boxes or black boxes and are used to define customised rates for insurance policies and/or real-time assistance in case of accidents and/or to reconstruct afterwards the dynamics of claims for the purposes of attributing liability to those involved. For example, an on-board device of the type indicated above is described in the international patent application filed by the same Applicant WO2013/150559.

The on-board devices of the prior art described above are able to locate the vehicle they are installed on in real time, to register the acceleration and deceleration, the trajectories, the charge status of the battery of the vehicle, and are also able to communicate with a remote processing centre. Usually the on-board devices comprise an electronic processor and various sensors operatively attached to the processing unit, such as an acceleration sensor, gyroscope, etc. This way, the processing unit can acquire and process data coming from different data sources. The on-board devices of the prior art suffer from the drawback of not being very flexible as regards the addition of further data sources to those originally provided in said on-board devices.

The object of the present description is to provide an on-board device which solves or at least partly reduces the drawback described above with reference to the prior art on-board devices.

Such object is achieved by an on-board device as generally defined in claim 1. Preferred and advantageous embodiments of the aforesaid on-board device are defined in the appended dependent claims.

The invention will be clearer to understand from the following detailed description of a particular embodiment, made by way of a non-limiting example with reference to the appended drawings, briefly described in the following paragraph.

DETAILED DESCRIPTION

Figure 1:
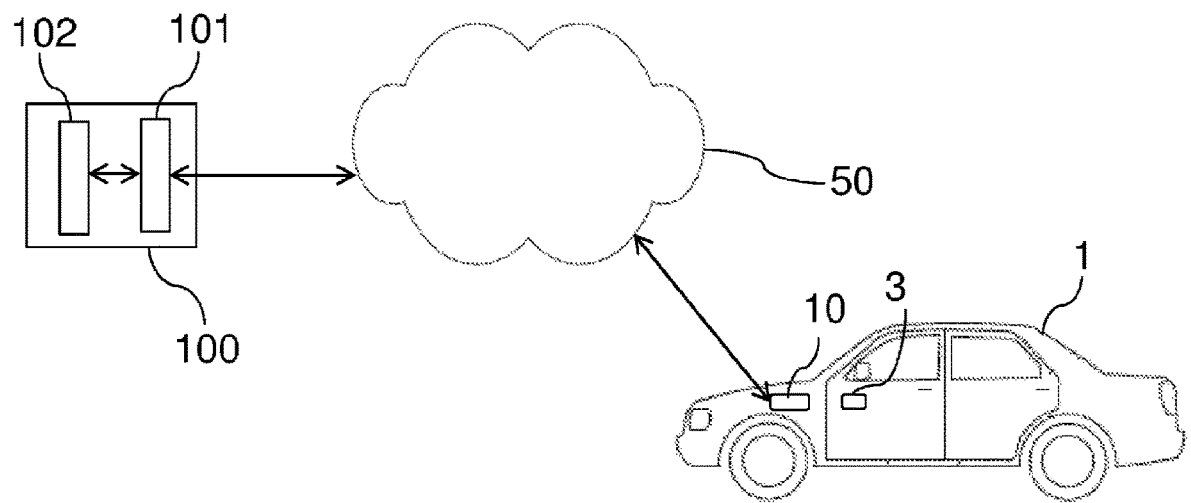
FIG. 1 shows a functional block diagram by way of example of a system for data transmission between an on-board device adapted to acquire data relating to motion and/or driving parameters of a vehicle and a remote processing centre.

FIG. 1 shows an embodiment by way of a non-limiting example of a data transmission system between an on-board device adapted to acquire data relating to motion and/or driving parameters of a vehicle and a remote processing centre. In the example, the system comprises an on-board device 10 installed in a vehicle 1. The vehicle 1 is for example a car, but could actually even be a motorcycle or public means of transport such as a bus, generally any transport or work vehicle, for example even an agricultural vehicle.

The data transmission system comprises a telecommunications network, for example a mobile cellular network 50, for example a GSM network. Such telecommunications network 50 comprises software and hardware equipment such as for example one or more mobile switching centres (MSC). The data transmission system further comprises at least one remote processing centre 100. The mobile cellular network 50 enables data transmission between the on-board device 10 and the remote processing centre 100. This data transmission is preferably a two-way transmission. The remote processing centre 100 is configured to receive and process data acquired from a plurality of on-board devices 10 installed on board respective vehicles 1. The remote processing centre 100 is a hardware and software system that allows the monitoring of vehicles 1 for example to evaluate risk factors in the driving thereof, the driving habits of the drivers of the vehicles, to receive rescue requests, detect accidents, theft etc. The number of vehicles 1 and therefore of the respective on-board devices 10 managed by the remote processing centre 100 may be as big as desired, for example, to the order of hundreds of thousands or millions.

According to one embodiment the remote processing centre 100 comprises a front end server 101 and a back-end server 102 operatively connected to each other. The front end server 101 is adapted and configured to receive connection requests from the on-board devices 10, and preferably to perform some pre-processing of the data received therefrom.

The back-end server 102 comprises an advanced computing platform and a database for storing and processing the data pre-processed by the front end server 101. The front end server 101 is adapted and configured to acts as a connection interface of the back-end server 102 to the mobile cellular network 50.

Figure 2:
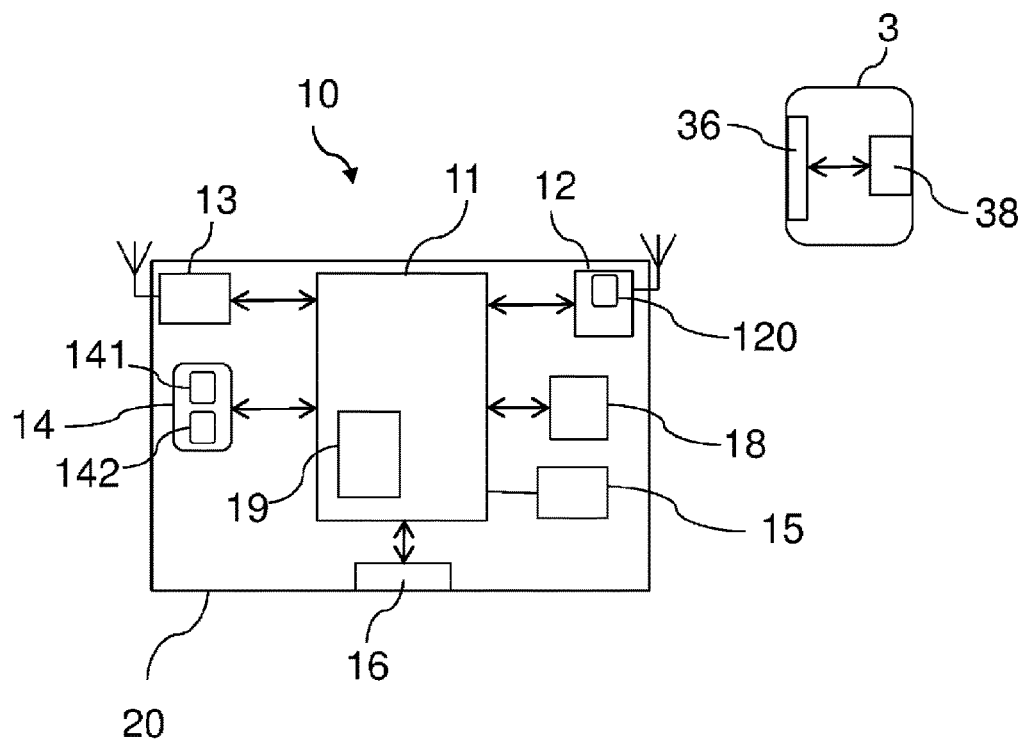
FIG. 2 shows a functional block diagram of an embodiment by way of a non-limiting example of an on-board device of the system in FIG. 1.

FIG. 2 shows a preferred, non-limiting embodiment of an on-board device 10. The on-board device 10 is for example, a black box. The on-board device 10 comprises a watertight container 20 inside which the electronic components of the on-board device 10 are housed. Preferably the on-board device 10 is powered by the battery of the vehicle 1 and more preferably the container 20 is attached to the aforesaid battery, for example, is attached on the battery.

Preferably, the on-board device 10 further comprises a voltage regulator circuit 15 adapted to power the on-board device 10 starting from the electrical signal provided by the battery of the vehicle 1.

The on-board device 10 comprises a processing unit 11, such as for example a microcontroller or microprocessor, and a long-range radio communication interface, such as a GSM-GPRS interface 12 operatively connected to the processing unit 11. Such communication interface 12 preferably comprises a SIM 120, preferably a so-called SIM on chip. The on-board device 10 further comprises at least one sensor 14. For example the on-board device 10 comprises a triaxial accelerometer 141 and a gyroscope 142 operatively connected to the processing unit 11. According to a preferred embodiment the triaxial accelerometer 141 and the gyroscope 142 are digital MEMS and 3D devices integrated in a single electronic device 14.

The on-board device 10 further comprises at least one GNSS Receiver 13, such as an active GNSS antenna, operatively connected to the processing unit 11.

It is to be noted that the sensor 14 and the GNSS receiver represent a set of data sources integrated in the on-board device 10. For this reason, such data sources are defined as internal sources of the on-board device 10.

The on-board device 10 further comprises a short range communication interface 18, and in particular a Bluetooth™ communication interface operatively connected to the processing unit 11. The short-range Bluetooth™ communication interface 18 is preferably but not necessarily a BTLE—Bluetooth™ Low Energy Interface. This communication interface 18 advantageously allows the number of data sources of the on-board device 10 to be expanded, allowing the on-board device 10 to interface with data sources defined as external sources of the on-board device 10. For example, the short range communication interface 18 connects the on-board device 10 to an external device 3. External is taken to mean physically separate from the on-board device 10, for example placed outside the container 20, and placed within the operating range of the communication interface 18. Such external device 3 may be a device present in the vehicle 1 or installed on board the vehicle 1 or a device external to the vehicle 1 and placed near the vehicle 1 and in any case within the operating range of the short-range communication interface 18.

The external device 3 comprises at least one data source 36 and a short-range Bluetooth™ radio communication interface 38, for example BTLE, adapted and configured to interface with the short-range communication interface device 18 of the on-board device so that the latter can receive data from the data source 36.

The data source 36 is adapted to provide in output a data signal bearing data acquired from the data source 36 and comprises for example one or more of the following devices individually or in all the possible combinations: a processing unit, a physical connector to an external system, an actuator such as a push-button, a sensor, a memory. For example, the data source 36 comprises a physical OBD connector—On Board Diagnostics—adapted to connect the external device 3 to the OBD port provided on the vehicle 1 scheduled for diagnostic purposes. This way, thanks to the short-range Bluetooth™ communication interface 18 the on-board device 10 can be connected to the Engine Control Unit ECU of the vehicle 1, for example to receive diagnostic data or data related to the operation of vehicle components 1, such as airbags, engine, vehicle safety devices on board the vehicle 1, braking system, etc.

According to a preferred and non-limiting embodiment the on-board device 10 further comprises a communication port 16, for example comprising a physical connector, operatively connected to the processing unit 11. To this communication port 16 a further device not shown in the drawings may be connected, the purpose of which is to increase the capacity and/or functions of the on-board device 10 such as the storage resources or processing resources or communication interfaces or the number and/or type of sensors. It is evident that this way it is also possible to further increase the number and/or type of external data sources of the on-board device 10.

The on-board device 10 further comprises a log memory 18 for example integrated in the processing unit 11. The on-board device 10 through the processing unit 11 is such as to store periodically and/or based on events in the Log memory 18 data relating to motion and/or driving parameters of the vehicle 1. Such data comprises, for example and without thereby introducing any limitations: speed, accelerations, decelerations, shock, location, diagnostic data of the vehicle 1, alarms generated by the on-board device 10, temperature, etc. Typically this data comprises data regularly acquired during normal use of the vehicle, for example on a periodic basis, and herein referred to as "first data" and data stored in the case of special events, for example events that the processing unit 11 may interpret as potentially representative of events such as a theft or an accident, herein referred to as "second data".

The first and second data are transmitted from the on-board device 10 to the remote processing centre 100 via the long range communication interface 12.

As it is known, a short-range Bluetooth™ communication interface is adapted and configured to communicate using signals transmitted and received on at least one data channel and at least one advertising channel. For example there are 37 data channels and 3 advertising channels. The communication of signals on advertising channels generally takes place in broadcast mode, without establishing a dedicated point-to point communication between two devices and for this reason does not require pairing between the two devices. This communication is typically used in preliminary operations in which two devices with Bluetooth™ interfaces are able to identify each other in order to pair up. In other words, an advertising channel allows a device with a Bluetooth™ interface to communicate its presence to other devices with the same interface and present within the operating range of the Bluetooth™ interface and in the same manner to detect the presence of such devices in said operating range. The communication between two devices equipped with a Bluetooth™ interface using signals transmitted and received on a data channel requires instead a pairing between the two devices.

The on-board device 10 is adapted and configured to receive data from the external device 3 and thus from the data source 36 using data signals transmitted by the external device 3 on at least one advertising channel of the short-range Bluetooth™ communication interface 18. Clearly, the communication between the two devices 10 and on the aforesaid advertising channel can be bidirectional. In other words, the on-board device 10 and the external device 3 are adapted and configured, i.e. programmed, to communicate with each other using data signals transmitted on the aforesaid advertising channel. Such communication does not require a prior pairing between the devices, understood in the sense of the pairing procedure envisaged by Bluetooth™ protocols.

According to one embodiment, the on-board device 10 and the external device 3 are adapted and configured, i.e. programmed, to communicate via data signals transmitted and received solely on one or more advertising channels.

According to a particularly advantageous embodiment the aforesaid communication on the advertising channel is an encrypted communication, for example with a common encryption key known to both the on-board device 10 and the external device 3. According to a preferred embodiment, in the case in which the same on-board device 10 is operatively connected to a plurality of external devices 3, both the on-board device 10 and the external devices 3 are such as to all use a common encryption key, therefore known to both the on-board device 10 and all the external devices 3 connected to it. In other words, the on-board device 10 is adapted and configured to communicate via said first short range radio communication interface with a plurality of external devices 3 using the same common encryption key.

For example, it is possible to provide that both the on-board device 10 and the external device 3 (or external devices 3) are initially configured to communicate with each other in an encrypted manner using a common encryption key set in the two devices during manufacturing. Such key may be common to a multitude of on-board devices and external devices. After installation on the vehicle, the on-board device 10 is adapted and configured, i.e. programmed, to receive from the remote processing centre 100 a new encryption key, this time dedicated and to communicate such new encryption key to all the external devices 3 located within the operating range of the short range Bluetooth™ communication interface 18.

In the event that an on-board device 10 is connected, i.e. associated, with a plurality of external devices 3, it is possible to provide that the transmission of data signals from external devices 3 to the on-board device 10 takes place on the same advertising channel. In such case, the on-board device after receiving a data signal from an external device will communicate receipt of the data signal to such device, for example by sending an ack signal which may in any case also be received (and possibly correctly deciphered) by all the other external devices 3. In some cases, for example when one external device 3 is such as to transmit a greater amount of data to the on-board device 10 than the other external devices, it will be possible to dedicate a specific advertising channel to said external device 3.

From the above description it is evident that an on-board device 10 of the type described above makes it possible to fully achieve the intended purposes in terms of overcoming the drawbacks of the prior art.

Such on-board device indeed overcomes the drawbacks of the devices of the prior art by ensuring considerable flexibility in relation to the possibility of being able to interface with external data sources.

Without prejudice to the principle of the invention, the embodiments and construction details may be varied widely with respect to what has been described and illustrated purely by way of a non-limiting example, without thereby departing from the scope of the invention as defined in the appended claims.

The invention claimed is:

1. An onboard device adapted and configured to acquire data relating to motion and/or driving parameters of a vehicle, comprising:

at least one data source internal to the onboard device adapted to provide in output a first data signal containing data correlated to motion and/or driving parameters of the vehicle;

a data processing unit operatively connected to the internal data source to receive and process said first data signal;

a long range radio communication interface operatively connected to the data processing unit to allow a data transmission on a telecommunications network between the data processing unit and a remote processing center;

a first short range Bluetooth™ radio communication interface operatively connected to the data processing unit to allow the onboard device to receive at least one data signal from an external device, the external device comprising a data source external to the onboard device and a second short-range Bluetooth radio communication interface;

wherein:

the onboard device is adapted and configured in particular programmed in such a way that the first short range Bluetooth™ radio connection interface is adapted and configured for allowing the onboard device to receive data signals from the external device on at least one advertising channel of the first short range Bluetooth™ radio connection interface;

the onboard device is programmed to receive encrypted data signals on the advertising channel and wherein the processing unit is programmed to decode said data;

said data signals are encrypted with a common encryption key known to both said onboard device and to said external device; and said onboard device is adapted and configured to receive the encryption key from the remote processing center through the long range communication interface to transmit said encryption key to said external device through the short range Bluetooth™ radio communication interface.

2. The onboard device according to claim 1, wherein said data signals contain data acquired from said external data source.

3. The onboard device according to claim 2, wherein said external data source comprises at least one sensor.

4. The onboard device according to claim 1, wherein said onboard device and said external device are programmed to exchange with each other exclusively data signals transmitted and received on said at least one advertising channel.

5. The onboard device according to claim 1, wherein said onboard device is adapted and configured to communicate via said first short range radio communication interface with a plurality of said external devices using the same common encryption key.

6. The onboard device according to claim 1, wherein said onboard device is a black box.

* * * * *